United States Patent [19]
Best et al.

[11] Patent Number: 4,702,212
[45] Date of Patent: Oct. 27, 1987

[54] ELECTROMAGNETICALLY OPERABLE VALVE

[75] Inventors: Christopher H. Best, London; David F. Lakin, Gloucester; Timothy M. Simpkins, Wembley, all of England

[73] Assignee: Lucas Industries public limited company, Birmingham, England

[21] Appl. No.: 802,308

[22] Filed: Nov. 27, 1985

[30] Foreign Application Priority Data

Nov. 30, 1984 [GB] United Kingdom ................. 8430259

[51] Int. Cl.4 ........................ F16K 31/06; F02M 51/00
[52] U.S. Cl. ............................... 123/472; 251/129.02; 251/129.15
[58] Field of Search ....................... 251/129.02, 129.15; 123/472

[56] References Cited

U.S. PATENT DOCUMENTS 4,187,987 2/1980 Rave .......................... 251/129.15 X
4,258,674 3/1981 Wolff .............................. 123/472 X
4,484,727 11/1984 Harris et al. ............... 251/129.15 X
4,573,659 3/1986 Homes ............................ 251/129.02

*Primary Examiner*—Arnold Rosenthal

[57] ABSTRACT

An electromagnetically operable valve for controlling the escape of fuel from the pumping chamber of a high pressure pump includes a valve member slidable in a bore from the end of which extends an outlet about which is formed a conical seating. The valve member is shaped to cooperate with the seating and is urged into contact with the seating when an electromagnetic device is energized. A fuel inlet passage connected to the pumping chamber extends into a chamber defined by a reduced portion of the valve member and the portion thereof which slides in the bore forming a step which defines an annular surface which is exposed to the pressure in said chamber. When the device is deenergized the fuel pressure acting on said surface acts to move the valve member to the open position.

10 Claims, 3 Drawing Figures

ELECTROMAGNETICALLY OPERABLE VALVE

This invention relates to an electromagnetically operable valve for controlling the escape of fuel from the pumping chamber of a high pressure fuel injection pump, the pumping chamber having an outlet communicating therewith and through which fuel flows during a pumping stroke of the apparatus when said valve is closed.

In the use of the pump the valve is supplied with electric current by an electronic control system which is responsive to various operating parameters of the engine to which fuel is supplied and during the delivery stroke of the high pressure pump will be closed to initiate delivery of fuel and then opened when the required quantity of fuel has been displaced through the outlet. It is essential therefore that the valve should be capable of being moved from its open position to its closed position and vice versa, as quickly as possible while at the same time it should dissipate the minimum amount of power.

The object of the present invention is to provide an electromagnetically operable valve for the purpose specified, in a simple and convenient form.

According to the invention an electromagnetically operable valve for the purpose specified comprises a valve housing, a bore formed in the housing, a valve member slidable in said bore, a chamber into which said valve member extends, an outlet opening formed in the wall of said chamber, a seating defined about said outlet opening, said valve member being shaped for co-operation with said seating, an inlet passage communicating with said chamber, said inlet passage in use being connected to said pumping chamber, a solenoid, an armature associated with said solenoid and operatively connected to the valve member and which when the solenoid is energised urges the valve member into engagement with the seating, and a surface defined on the valve member and against which in the open and closed positions of the valve, fuel under pressure in said chamber can act to urge the valve member to the open position.

Figure 1:
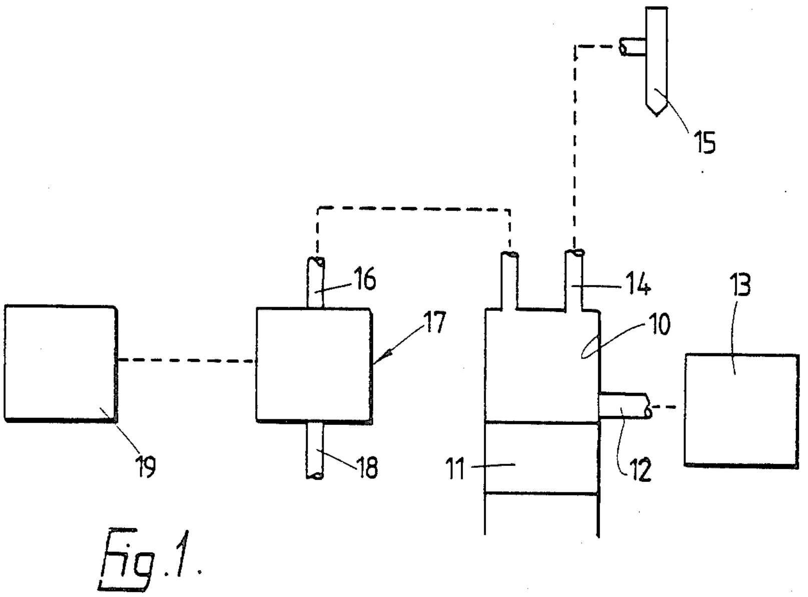
Figure 2:
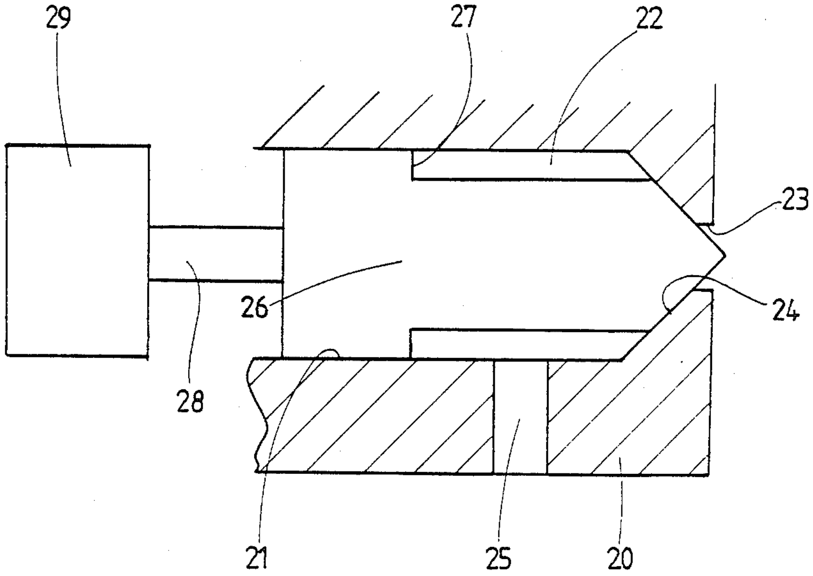
Figure 3:
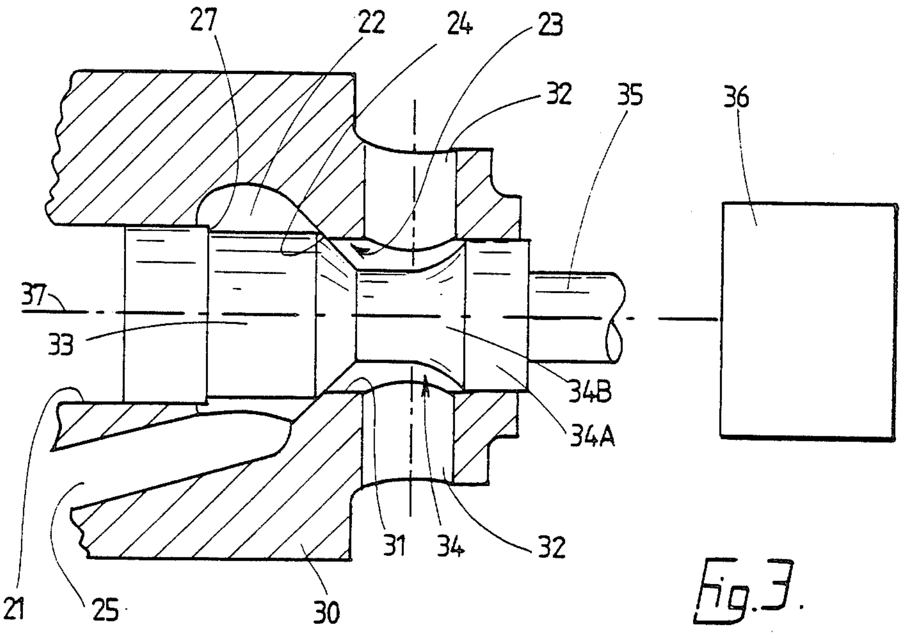

In the accompanying drawings:

FIG. 1 is a diagrammatic representation of the pump and associated valve and control system, FIG. 2 shows in sectional side elevation, one example of a valve in accordance with the invention, and FIG. 3 is a view similar to FIG. 2 showing a further example of the valve.

Referring to FIG. 1 of the drawings the high pressure pump comprises a cylinder 10 in which is reciprocably mounted a pumping plunger 11, the plunger 11 being actuated by means of an engine driven cam not shown. Formed in the wall of the cylinder 10 is a port 12 which communicates with a source 13 of fuel at low pressure conveniently a low pressure engine actuated pump.

Communicating with the cylinder is an outlet 14 which is connected in use to a fuel injection nozzle 15 of the associated engine and also communicating with the cylinder 10 is the inlet 16 of an electromagnetically operable valve 17 the outlet 18 of which may be connected to a drain or to the inlet or the outlet of the low pressure pump 13. The electromagnetically operable valve includes a solenoid to which electric current is supplied by means of a control system 19 which in known manner, receives signals indicative of various engine operating parameters and desired operating parameters.

In use, with the valve 17 open, as the plunger 11 moves upwardly and inwardly in the cylinder, a point will be reached at which the port 12 will be closed and fuel will then be displaced from the pumping chamber defined by the cylinder and the plunger, through the open valve 17. No fuel will be displaced through the outlet 14 because the injection nozzle contains a pressure operated spring loaded valve member.

When it is desired to deliver fuel to the associated engine, the valve 17 is closed and the fuel in the pumping chamber will be pressurized to the level at which the valve in the nozzle is opened thereby allowing fuel flow to the associated engine. When it is decided by the control system that sufficient fuel has been delivered to the engine, the valve 17 is opened whereupon the pressure in the pumping chamber falls and the valve in the injection nozzle is closed. The plunger 11 will in general continue its inward movement and the fuel displaced from the pumping chamber will flow through the valve 17. When the plunger reaches the end of its stroke and returns, fuel can flow into the pumping chamber by way of the valve 17 or the latter may be closed so that fuel can only flow into the cylinder when the port 12 is uncovered by the plunger.

It will be seen that closure of the valve during the inward stroke of the plunger determines the start of delivery of fuel to the associated engine and opening of the valve determines the cessation of fuel flow to the engine. In order to control the start of delivery and the quantity of fuel it is necessary for the valve 17 to operate quickly and consistently. Turning now to FIG. 2, there is illustrated one example of the valve and it will be seen to comprise a housing 20 in which is formed a bore 21 one end portion of which defines a valve chamber 22. Opening from one end of the chamber is an outlet 23 and defined about the outlet 23 is a conical seating 24 which tapers inwardly in the direction of flow through the outlet from the chamber. Moreover, opening into the chamber 22 is an inlet passage 25 which is connected to the inlet 16 of the valve the outlet 23 being connected to the outlet 18 of the valve.

Slidable within the bore 21 is a valve member 26 which extends through the chamber and is shaped for co-operation with the seating 24. The portion of the valve member within the chamber is of reduced diameter so as to define an annular surface 27 which is exposed to the pressure within the chamber 22 irrespective of whether the valve is open or closed. The valve member is connected to the output member 28 of an electromagnetic device 29, the device 29 including a solenoid which is wound upon a magnetic core structure, and an armature which when the solenoid is energised, moves the output member 28 and the valve member 26 to the position shown in the drawing with the valve member in contact with the seating therefore preventing flow of fuel through the outlet 23. In this position of the valve member the air gaps between the pole faces of the armature and the pole faces of the stator structure will be at their minimum.

In the closed position of the valve member and during inward movement of the pumping plunger 11 after the port 12 has been closed, the pressure in the valve chamber 22 will be extremely high corresponding to the injection pressure of the fuel and this pressure will act upon the surface 27 to create a force tending to move the valve member away from its seating. This force is resisted by the force generated by the electromagnetic device 29 and since the aforesaid air gaps are at a minimum, the force developed by the device will be at its maximum. When the solenoid is deenergised, the force acting on the surface 27 will urge the valve member away from the seating 24 and such movement will be imparted to the armature of the device 29. Fuel will therefore flow at a high velocity through the annular gap which is defined between the seating and the valve member. The flow of fuel will generate a force on the valve member which has an axial component acting to assist the force tending to open the valve and due to the pressure in the chamber 22 acting upon the surface 27. The valve therefore will rapidly move to its open position and the pressure within the chamber 22 will quickly fall thereby leading to a rapid reduction in the pressure within the pumping chamber.

When during the inward movement of the pumping plunger 11 with the port 12 closed, it is desired to start delivery of fuel, the solenoid of the device 29 is energised. In this situation the pressure within the chamber 22 is comparatively low so that the force developed by the pressure acting on the surface 27 will also be comparatively low. As the valve member moves towards the closed position the pressure in the chamber 22 will increase due to an increasing restriction to the flow of fuel. However, the air gaps in the device 29 diminish in length as the valve member moves towards the closed position and the device 29 therefore produces an increasing force which is sufficient to overcome the force generated by the fluid pressure acting on the surface 27 and the axial component of the force generated by the action of the fuel flowing through the diminishing clearance between the valve member and the seating. The valve is therefore capable of being moved to the closed position.

A further example of the valve is seen in FIG. 3 and parts which have the same function as the valve of FIG. 2 have been assigned the same reference numeral. In this example the valve housing 30 is shown to extend beyond the outlet 23 this being defined by a bore 31 which is slightly smaller in diameter than the bore 21. Extending into the bore 31 are passages 32 which form the outlet from the valve. In addition, the valve member 33 is provided with an extension 34 the part 34A of which remote from the seating is located with a small working clearance in the bore 31 but which immediately downstream of the portion of the valve member which co-operates with the seating, is of reduced diameter. The reduced diameter portion 34B flares outwardly to the diameter of the part 34A. The extension is connected to the output member 35 of the electromagnetic device 36, which in this case pulls the valve member to the closed position when the solenoid is energised. It will also be noted in FIG. 3 that the inlet passage 25 which is connected to the chamber 22 enters the chamber at an angle to the axis 37 of the valve member and that the passages 32 extend at right angles relative to the axis 37. The inclination of the passage 25 is such that the fuel flow through the passage does not hinder the closure of the valve member onto the seating. The inclination of the inlet passage may also be applied to the example of FIG. 2.

As has been stated the valve member in the closed position is not pressure balanced both so far as the pressure in the valve chamber 22 is concerned and also in the case of the valve shown in FIG. 2 is not balanced so far as the pressure in the outlet 23 is concerned. The valve member will therefore have a natural tendency to open thereby obviating the need for an opening spring.

The opening rate of the valve member, at least in the initial stages, depends upon the pressure in the chamber 22. The pressure depends upon the speed of the associated engine and therefore the rate of opening of the valve depends upon the engine speed. There is however a lower limit to this pressure which is determined by the nozzle opening pressure. The fact that the rate of opening does depend on the speed is useful in that it means that the valve opening time in terms of degrees of engine crankshaft rotation remains substantially constant. The actual force available to open the valve depends on the annular area 27 and it is very easy to vary this area during manufacture of the valve member so that the opening force is independent of the flow area of the valve.

We claim:

1. A means for controlling fuel flow to a fuel injection nozzle of a combustion engine comprising a pumping chamber of a high pressure fuel injection pump, the pumping chamber having an outlet communicating therewith and through which fuel flows to the fuel injection nozzle during a pumping stroke of the apparatus, an electromagnetically operable valve for controlling the escape of fuel from said pumping chamber to the fuel injection nozzle, said electromagnetically operable valve comprising a valve housing, a first bore formed in the housing, a valve member slidable in said bore, a chamber into which said valve member extends, an outlet opening formed in the wall of said chamber, a seating defined about said outlet opening, said seating being tapered inwardly in the direction of fuel flow through said outlet from said pumping chamber, whereby a reaction force is applied to the valve member tending to urge the valve member to an open position, said valve member being shaped for co-operation with said seating, an inlet passage communicating with said chamber, said inlet passage in use being connected to said pumping chamber, a solenoid, an armature associated with said solenoid and operatively connected to the valve member and which when the solenoid is energised urges the valve member into engagement with the seating, and a surface defined on the valve member and against which in the open and closed positions of the valve, fuel under pressure in said chamber can act to urge the valve member to the open position said outlet being defined by a further bore formed in said housing, said further bore having a diameter smaller than said first bore, said valve member defining an extension which extends into said further bore, the part of the extension remote from said seating having a working clearance with said further bore, and the portion of the extension intermediate said part and the part of the valve member which co-operates with said seating being of reduced diameter, and an outlet extending from said further bore.

2. A means according to claim 1 in which said surface is of annular form and is defined on a step formed between a portion of the valve member slidable in the bore and a reduced portion of the valve member.

3. A means according to claim 1 in which said inlet passage is inclined to the axis of movement of the valve member.

4. A means according to claim 2 in which said chamber is defined by the wall of said first bore and said reduced portion of the valve member.

5. A means according to claim 4 in which said first bore is enlarged adjacent the seating.

6. A means according to claim 1 further including a low pressure fuel source connected to said pumping chamber.

7. A means according to claim 6 further including means fluidly connecting said electromagnetically operable valve outlet opening to said low pressure fuel source.

8. A means according to claim 7 further including a pumping plunger in said pumping chamber, said pumping plunger being actuated in accordance with operation of the combustion engine.

9. A means according to claim 8 further including a control system connected to said electromagnetically operable valve for controlling operation of the fuel injection nozzle, said control system closing and opening said valve to determine the start and cessation respectively of delivery of fuel to the combustion engine via the fuel injection nozzle from said pumping chamber, said electromagnetically operable valve fluidly connecting said pumping chamber to a means for receiving fuel from said pumping chamber when said valve is open and causing said pumping plunger to increase pressure in said pumping chamber when said valve is closed whereby pressure increases in said pumping chamber sufficiently to operate said fuel injection nozzle when said valve is closed.

10. A means according to claim 6 further including means fluidly connecting said electromagnetically operable valve outlet opening to a drain.

* * * * *